Figure 1:
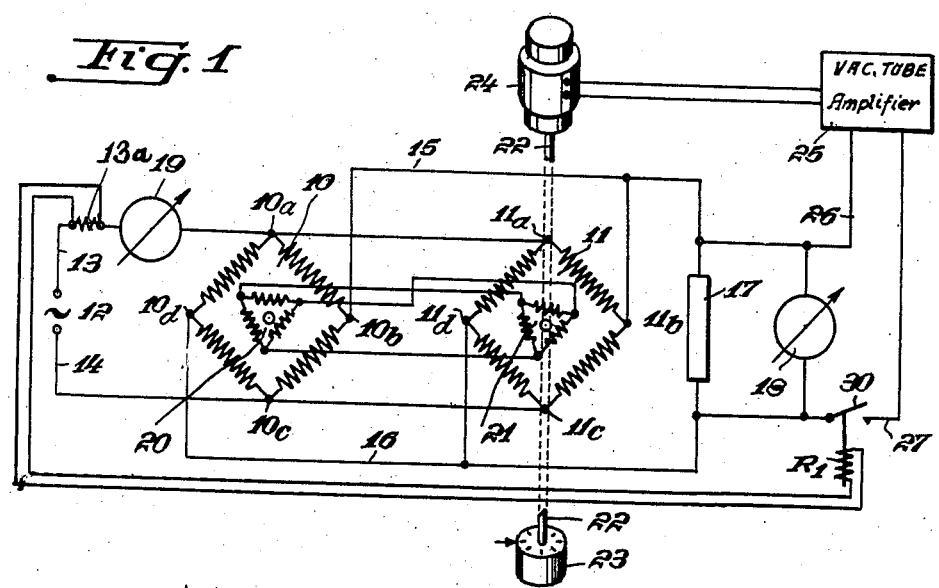

April 1, 1941.  H. HEUSCHMANN  2,237,225

SYNCHRONOUS TRANSMISSION SYSTEM

Filed May 10, 1939

INVENTOR
Hans Heuschmann
BY
Stephen Arstvik
ATTORNEY

Patented Apr. 1, 1941

2,237,225

UNITED STATES PATENT OFFICE 2,237,225

SYNCHRONOUS TRANSMISSION SYSTEM

Hans Heuschmann, Berlin-Spandau, Germany, assignor to Siemens Apparate und Maschinen Gesellschaft mit beschränkter Haftung, Berlin, Germany, a corporation of Germany Application May 10, 1939, Serial No. 272,932
In Germany December 10, 1935

7 Claims. (Cl. 172—239)

This invention relates to synchronous transmission systems, and more particularly to a method and means for adjusting the elements of such a system.

One of the objects of the present invention is to provide a novel method and means for reducing the errors of a synchronous transmission system.

Another object of the invention is to provide novel means for bringing a synchronous receiver into phase with a transmitter smoothly, with an absence of impact shocks.

A further object is to provide a novel method of the above character which positively prevents a synchronous receiver from operating 180° out of phase with a transmitter.

An additional object is to provide a novel apparatus for automatically reducing to zero the errors in phase relation of a synchronous transmitter and receiver.

The above and further objects and novel features will more fully appear from the following detailed description when the same is read in connection with the accompanying drawing. It is to be expressly understood, however, that the drawing is for purposes of illustration only and is not intended as a definition of the limits of the invention, reference for this latter purpose being had to the appended claims.

Figure 2:
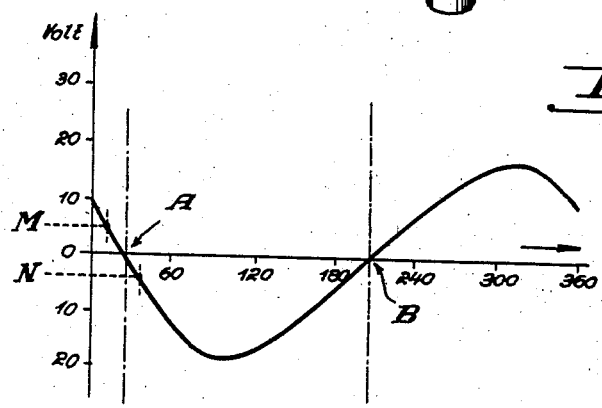
Figure 3:
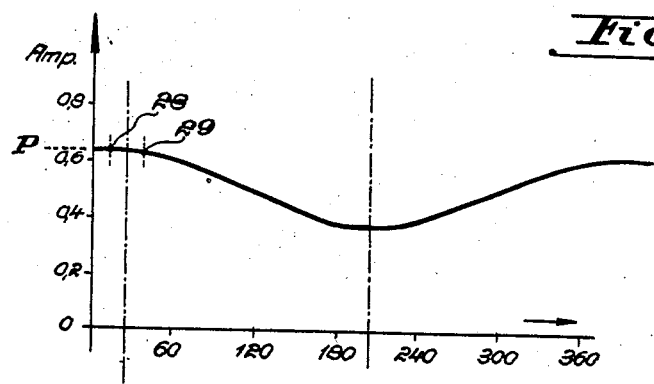

In the drawing, wherein like reference characters refer to like parts throughout the several views, Fig. 1 is a schematic wiring diagram of one embodiment of the present invention;

Fig. 2 is a graphical representation of the voltage fluctuations in a portion of the stator circuit shown in Fig. 1; and, Fig. 3 is a graphical representation of current fluctuations in the exciter circuit of the synchronous system shown in Fig. 1.

It has been heretofore proposed that a synchronous transmission system be used for moving one mass in synchronism with another, the system comprising a transmitter and receiver, for example, in bridge connection, the direction and speed of the mass movements being prescribed by the transmitter. The receiver in this example is connected to the mass to be moved. A four-phase winding of said bridge system may be employed, which is symmetrically disposed upon the bridge stator of the transmitter and receiver and is thereby excited at two diametrically opposed points. When both rotors of the bridge system are in synchronism the voltages of the four phases are equal and the error voltage measured at the bridge points equals zero. Upon angularly shifting a rotor, for example, of a transmitter relative to a receiver, a field displacement occurs in the stator creating an unbalance of said four voltages, and a transmission occurs of the difference in the voltages of every two opposing bridge arms as an error voltage, the magnitude of which depends on the displacement of the rotors with respect to each other.

It has also been heretofore proposed that the error voltage be employed for the control of a servo-motor which is drivably connected to the mass to be moved, in order that position errors may be rapidly eliminated. The error voltage may be amplified by a suitable vacuum tube amplifier for this purpose.

Furthermore, means have been previously suggested for determining the extent of the phase difference of the rotors of a transmitter and receiver, i. e. of the shafts of a transmitter and receiver. The means are responsive to a difference of potential which occurs when said shafts are in an "error position," that is, when they are not in a proper phase relationship due, for example, to a disturbance of the balance between the zero points of the bridges of each stator or between corresponding zero points of both bridges. The potential difference can also serve directly for the control of a drive unit for balancing the difference in position of the two shafts. Suitable current or voltage sensitive instruments may be connected in the equalizer leads of said bridges for indicating the difference in position of said shafts.

A displacement of the transmitter relative to the receiver occurs if, for example, a jammed or tight gear train exists in the device which is to be driven by the receiver. Such a condition may occur at the beginning of the operation of the apparatus or during the course of operation. The obstruction to free movement may disappear when the receiver and transmitter are out of phase by a considerable amount. At the moment of the removal or overcoming of the obstruction, the error voltage which has been created in the meantime becomes effective and imparts a blow or shock to the control device with the result that the receiver is displaced with an impact shock until it assumes the position of the transmitter.

When the rotor of either the transmitter or receiver is rotated through 360° relative to the other rotor, the error voltage changes not only with respect to its magnitude but also with respect to its direction in that it passes through zero twice. In order to avoid the above-mentioned impact, the error voltage must be connected in at a "zero passage." However, since two "zero passages" occur, it is possible for the error voltage to be connected in at an improper time to the servo-motor circuit which would produce an error of 180° in the phase relationship of transmitter and receiver. The present invention relates to a method and means of overcoming these difficulties.

One embodiment of the novel apparatus employed in carrying out the novel method is illustrated in Fig. 1, wherein there is provided a self-synchronous transmission system of the bridge type having stators 10 and 11 as transmitting and receiving bridges respectively, the bridges each having four arms, and terminals at end points 10a, 10b, 10c and 10d, also at 11a, 11b, 11c and 11d. Points 10a, 11a and 10c, 11c are connected to a power source 12 by means of conductors 13 and 14, respectively. The remaining points 10b, 11b and 10d, 11d are interconnected by leads 15 and 16, respectively, forming an "error-voltage" circuit. A load or resistance 17 is connected across leads 15 and 16 having a voltmeter 18 connected on either side thereof for measuring the error voltage. An ammeter 19 is inserted, for example, in lead 13 for measuring the current in the exciter or power circuit.

Suitable armatures 20 and 21, for the transmitter and receiver, respectively, are provided, each having a three-phase winding and being connected in a conventional manner. The receiver 21 is operatively connected by means of a shaft 22 to a dial 23 constituting "the mass to be moved," and is also connected to a servo-motor 24 which is controlled by a voltage from a vacuum tube amplifier 25, the latter in turn being governed by the above-mentioned error-voltage which is connected thereto, during a predetermined period, through leads 26, 27.

As above mentioned, the error-voltage during the course of its fluctuations passes zero twice, i. e. two zero passages occur during an angular displacement of 360° of the transmitter relative to the receiver. It is therefore necessary to be able to distinguish one zero passage from the other in order to avoid actuating the servo-motor to provide a control impulse at such a time that it will move the receiver into a position 180° out of phase with the transmitter. Methods cannot be employed for distinguishing one zero passage from another which use as a criterion the direction of the phase displacement of the transmitter relative to the receiver, since this direction is not fixed from which the movements into the zero position occur. The method for distinguishing one zero passage from another is based upon an examination of the changes in the exciter current during the changes in error-voltage.

As illustrated in Fig. 2, the error voltage follows a substantially sinusoidal path during a relative angular displacement of 360° of the transmitter and receiver. Two zero passages occur, one at A in the short circuit or in-phase position, and another at B in the idling position. The slope of the curve at A is greater than at B and is therefore the preferable part of the curve upon which to base the control of amplifier 25. The simultaneously fluctuating exciter current is shown graphically in Fig. 3 wherein the current reaches a maximum concurrently with the passage of the error-voltage through zero at A, and reaches the lowest point as the error-voltage passes zero at B. It is therefore possible, by ascertaining the magnitude of the exciter current, to determine whether the error-voltage is making a zero passage at A or at B, and consequently it is possible to control suitable means which will permit the error-voltage to act, for example, upon the above-mentioned vacuum tube amplifier and servo-motor when the error-voltage is in the neighborhood of the in-phase position. The amplifier 25 acting in combination with the servo-motor 24 will then be prevented from driving the mass to be moved, i. e. the dial 23, into a position 180° removed from the in-phase relationship.

In order that the amplifier 25 may be automatically energized only when the exciter current is near its high point and the error-voltage near the zero passage A, a suitable relay $R_1$ may be connected in lead 13 which will be actuated when the current is at P (Fig. 3). Since the slope of the current at this peak is substantially zero, there is a portion of the curve, for example, between points 28 and 29, where the current is constant for all practical purposes. Between the points 28 and 29 it is seen in Fig. 2 that the error-voltage changes from M to N. A switch 30 is provided in lead 27 which is operatively connected to relay $R_1$ whereby the switch is thrown when the relay is actuated by the peak current. The range for connecting in the error-voltage can also be regulated by one or a plurality of relays which are actuated in accordance with a voltage drop occurring in a resistance 13a inserted in the exciter circuit.

In the operation of the synchronous system, certain errors may occur in the phase relation of the receiver and transmitter which are due, for example, to friction or defective construction. If such an error, for instance amounting to one or two degrees, should occur an error-voltage as above explained will exist. Since the phase error is here very small, the exciter current will be near the peak P and the error-voltage will be near the zero position at A. Consequently the relay $R_1$ will be actuated and the switch 30 will be closed thereby permitting a current to flow to the amplifier. The "error-voltage" will be stepped up a sufficient amount in amplifier 25 to actuate servo-motor 24 which, through shaft 22, will drive the receiver rotor 21 until the phase error is reduced to zero, at which time the error-voltage becomes zero and the servo-motor inoperative.

If a sudden change in the position of the transmitter should occur whereby a large phase error momentarily exists between the transmitter and receiver, the exciter current will drop and therewith the error-voltage will change and move beyond the limits M N. Consequently the switch 30 will open and the circuit to the amplifier 25 will be broken until the current again approaches its peak. It is therefore impossible for the servo-motor arrangement to act upon the receiver rotor during the period when the error-voltage is near the zero passage B, i. e. when the rotor is 180° out of phase. When the transmitter and receiver again approach the correct phase relation, the relay $R_1$ closes switch 30 and the phase error is reduced to zero as above described.

It is possible to dispense with the relay switch and with the servo-motor and amplifier and to control the apparatus by an operator located at the receiver who, by inspecting the voltmeter 18, is able to detect the occurrence of error and by determining the current is able to ascertain if the receiver is in the neighborhood of the correct phase relation or if it is 180° removed therefrom. An error can therefore be manually corrected without the danger of applying a false correction 180° out of phase.

There is thus provided a novel method and means for not only determining the position of a receiver relative to a transmitter but also for accurately adjusting one to the other whereby any phase error is reduced to zero. The method further provides a positive means for determining whether or not the receiver is approximately in phase, or if it is 180° removed therefrom. The novel apparatus is adapted for accurately and smoothly bringing the receiver into a proper phase relation and is further adapted for correcting phase errors only during a predetermined adjustment range, thereby eliminating the possibility of adjusting said receiver in a false position.

Although only one embodiment of the novel apparatus has been illustrated and described in detail and only one embodiment of the method has been described, it is to be expressly understood that the same is not limited thereto except as set forth in the following claims. For a definition of the limits of the invention, reference will be had primarily to the appended claims.

What is claimed is:

1. The combination with a transmission system having an exciter circuit, a transmitter and a receiver connected with said circuit, an error-voltage circuit interconnecting said transmitter and said receiver of amplifying means for an error-voltage existing in said last-named circuit when said receiver is out of phase with said transmitter, a servo-motor operatively connected to said receiver, said motor being governed by said amplifying means, and means for electrically disconnecting said amplifying means from said error-voltage circuit when a current in said exciter circuit changes from a predetermined value.

2. The combination with a transmission system having an exciter circuit, an error-voltage circuit, a transmitter and a receiver interconnected by said circuits, of amplifying means for a voltage in said error-voltage circuit, a servo-motor operatively connected to said receiver, said motor being governed by an electrical output of said amplifying means, a relay connected in said exciter circuit, a switch in said error-voltage circuit, said relay being operatively connected to said switch and operable at a predetermined current value.

3. In a synchronous transmission system having a transmitter and a receiver, an error voltage circuit connecting the transmitter and the receiver, a source of current, an exciter circuit connecting said transmitter and receiver with said current source whereby current flows in said exciter circuit, a servo-motor connected in said error voltage circuit for angularly moving said receiver, and means responsive to a predetermined value of current in said exciter circuit for disconnecting the servo-motor from said error-voltage circuit.

4. In a synchronous transmission system having a transmitter and a receiver, an error voltage circuit connecting the transmitter and the receiver, a source of current, an exciter circuit connecting said transmitter and receiver with said current source whereby current flows in said exciter circuit, a servo-motor for angularly moving said receiver, and means responsive to a predetermined value of current in said exciter circuit for connecting said servo-motor with said error-voltage circuit.

5. In a synchronous transmission system having a transmitter stator and rotor and a receiver stator and rotor, an error-voltage circuit connecting said transmitter and receiver stators, an exciter circuit electrically connecting said transmitter and receiver stators and having current flow therein, said transmitter and receiver rotors being electrically connected whereby angular movement of said transmitter rotor provides a coarse angular adjustment of said receiver rotor, a servo-motor for additionally angularly moving the receiver rotor into synchronous agreement with said transmitter rotor thereby defining a fine adjustment for said receiver rotor, and means responsive to a predetermined value of current in said exciter circuit for connecting said servo-motor with said error voltage circuit.

6. In a synchronous transmission system having a transmitter stator and rotor and a receiver stator and rotor, an electric circuit connecting said transmitter stator with said receiver stator, an exciter circuit having current flow therein connecting said transmitter and receiver stators, said transmitter and receiver rotors being electrically interconnected whereby angular movement of the transmitter rotor provides a synchronous movement of said receiver rotor, an error voltage being created in said electric circuit when said receiver rotor attains equilibrium before synchronism has been attained between said rotors, a servo-motor for angularly moving said receiver rotor, and means responsive to a predetermined value of current in said exciter circuit for energizing said servo-motor in accordance with said error voltage in said electric circuit whereby said servo-motor urges said receiver rotor into synchronous agreement with said transmitter rotor thereby preventing 180° ambiguity between said rotors.

7. In a synchronous transmission system having a transmitter stator and rotor and a receiver stator and rotor, an electric circuit connecting said transmitter stator with said receiver stator, an exciter circuit having current flow therein connecting said transmitter and receiver stators, said transmitter and receiver rotors being electrically interconnected whereby angular movement of the transmitter rotor provides a synchronous movement of said receiver rotor thus defining a coarse adjustment for said receiver rotor, an error voltage being created in said electric circuit when said receiver rotor attains equilibrium before synchronism has been attained between said rotors, a servo-motor for angularly moving said receiver rotor, amplifying means connected with said servo-motor, and means defining a fine adjustment for said receiver rotor responsive to a predetermined value of current in said exciter circuit for connecting said servo-motor and amplifying means in said electric circuit.

HANS HEUSCHMANN.